United States Patent
Holla et al.

(10) Patent No.: US 10,956,314 B2
(45) Date of Patent: Mar. 23, 2021

(54) METHOD AND SYSTEM FOR REGRESSION TEST SELECTION IN A MULTI-THREADED DISTRIBUTED TARGET PROGRAM EXECUTION TESTED BY MULTI-THREADED TEST SUITES

(71) Applicant: Infosys Limited, Bangalore (IN)

(72) Inventors: Kiran Voderhobli Holla, Bangalore (IN); Pradeep S, Bangalore (IN); Uday Kumar Gupta, San Ramon, CA (US); Kasthuri Ram V., Santa Clara, CA (US); Nimisha Sharma, Bhagalpur (IN)

(73) Assignee: INFOSYS LIMITED, Bangalore (IN)

( * ) Notice: Subject to any disclaimer, the term of this patent is extended or adjusted under 35 U.S.C. 154(b) by 0 days.

(21) Appl. No.: 16/672,252

(22) Filed: Nov. 1, 2019

(65) Prior Publication Data
US 2020/0142818 A1 May 7, 2020

(30) Foreign Application Priority Data
Nov. 2, 2018 (IN) .............................. 201841041662

(51) Int. Cl.
*G06F 9/44* (2018.01)
*G06F 11/36* (2006.01)

(52) U.S. Cl.
CPC ...... *G06F 11/3688* (2013.01); *G06F 11/3664* (2013.01)

(58) Field of Classification Search
None
See application file for complete search history.

(56) References Cited

U.S. PATENT DOCUMENTS 5,421,014 A * 5/1995 Bucher ................. G06F 9/4843
710/305
10,713,139 B2 * 7/2020 Duale .................... G06F 11/26
(Continued)

OTHER PUBLICATIONS

Ren, X. et al., "Chianti: A Tool for change Impact Analysis of Java Programs," OOPSLA '04, Oct. 24-28, 2004, Vancouver, British Columbia, Canada.
(Continued)

*Primary Examiner* — Anna C Deng
(74) *Attorney, Agent, or Firm* — Troutman Pepper Hamilton Sanders LLP (Rochester)

(57) ABSTRACT

A method, a system and a computer program product for regression test selection in a multi-threaded distributed target program execution tested by multi-threaded test suites. The method includes monitoring changes to source code of the target program in real-time to determine changed code-modules and extracting the regression test cases which simulate the changed code-modules. A calibration engine according to an embodiment isolates test case execution flow at individual test case level and builds relationship between the test case of the multi-threaded test suite and the distributed target program code-modules simulated by the test case. The method enhances the run-time behavior of the target program execution engines and builds relationships between the threads executing in the engine through throttling mechanism without affecting the actual functional execution. It enables calibration to happen in a multi-threaded test environment.

20 Claims, 6 Drawing Sheets

(56) References Cited

U.S. PATENT DOCUMENTS

| | | | | |
|---|---|---|---|---|
| 2007/0204137 | A1* | 8/2007 | Tran | G06F 1/324 |
| | | | | 712/214 |
| 2010/0023294 | A1* | 1/2010 | Fan | G01R 31/318513 |
| | | | | 702/123 |
| 2016/0070550 | A1* | 3/2016 | Van Eijndhoven | G06F 30/327 |
| | | | | 717/156 |
| 2019/0341036 | A1* | 11/2019 | Zhang | G10L 15/1822 |

OTHER PUBLICATIONS

Orso, A. et al., "Leveraging Field Data for Impact Analysis and Regression Testing," ESEC/FSE '03, Sep. 1-5, 2003, Helsinki, Finland.

* cited by examiner

METHOD AND SYSTEM FOR REGRESSION TEST SELECTION IN A MULTI-THREADED DISTRIBUTED TARGET PROGRAM EXECUTION TESTED BY MULTI-THREADED TEST SUITES

This application claims the benefit of Indian Patent Application Serial No. 201841041662 filed Nov. 2, 2018, which is hereby incorporated by reference in its entirety.

FIELD

The invention generally relates to software regression testing and aids in test selection. In particular, the present technique relates to a method and system for regression test selection in a multi-threaded, distributed target program tested by a multithreaded regression test suite.

BACKGROUND

Modern day testing frameworks make extensive use of multi-threaded (multi-user or parallel) test execution and there are no known solutions currently to track the execution path of multi-threaded, distributed target program execution at an individual test-case level. Each time the software is released to production with new features, it has to be regression-tested to ensure that the new software code has not introduced any defect into the existing program features. The regression testing is a costly exercise in terms of time and effort. Due to inter-dependencies in modern day software code, a single line of code-change may cause potential defects in any other part of the code and hence the entire software product needs to be regression tested. Moreover modern day software deployment pipelines require an instant feedback on whether the new code introduced causes any existing feature to break. Running entire regression suites in such scenarios is impractical. Selecting and executing only a subset of regression test cases based on impact becomes a key need.

Existing Techniques etc. discloses, tracking the target program execution through dynamic analysis and creating a mapping using code coverage tools but this solution works for single-threaded regression test suites only. This is an impractical pre-requisite considering most modern day test suites are multi-threaded in nature. Changing the execution mode of the regression test suite to single-threaded execution causes a huge spike in the execution time. As the test-coverage increases, the number of regression test cases increase correspondingly and the difference would only exacerbate over time rendering any such solution ineffective. Moreover, as far as target programs having a user interface (UI) is concerned, the parallel execution of regression test cases is essentially required even at lower test coverage, owing to the slow nature of UI execution where each parallel thread represents a different user performing a series of actions while interacting with the software program using the UI. Moreover the inter-play of parallel threads or multi-users present a more realistic replica of production execution and may be preferred over the single-thread or single-user test execution model. Most importantly, the dynamic tracking of program execution to map the test cases to program code-modules (called calibration process henceforth) is not a one-time affair but is an ongoing process wherein the mapping needs to be constantly refined and re-calibrated for each source code change.

Running the test suite in single threaded mode places severe constraints on the net execution time saved (ETS) as the time saved due to regression test selection could be more than offset by the additional calibration time which could be exponentially higher in single threaded mode and may render ETS into potentially negative territory. This is particularly true for target programs having an UI where each user session is treated as a separate thread. Testing such type of programs in a single threaded test execution mode causes a sequential action for each test case and leads to an exponential increase in execution time. This is compounded by the fact that even a very small configuration or code change could trigger a large change in the execution flow for a number of test cases and render the mapping data meaningless and hence calibration is not a one-time activity but needs to be done on a far more frequent basis.

In a conventional Rothermel and Harrold approach, the regression test selection process is implemented by mapping each test case to the code modules of the target program that gets simulated during execution. However, in order to meet the Rothermel and Harrold's definition in principle, the entire calibration has to be run at frequent intervals potentially pushing ETS into negative territory. In ideal case scenarios, the calibration must be done for every single code change check-in into the source code control system. A more practical approach may be to run the calibration at least once every few hours or at end-of-day, whereas the condensed regressions are run for every single code check-in. In either case there is a need to bring-in calibration time into the equation. The entire test selection edifice and all possible approaches collapse if ETS were negative.

Hence there is a need to optimize the calibration time. During calibration in the multi-threaded test execution scenario, the interplay of threads gets quite complicated as thread execution sequence is not guaranteed either on the regression test execution machine (RTEM) or on the target program execution machine (TPEM). Another complication is that for many modern day programming languages, all threads executing are considered siblings of each other and relationships are not maintained. For e.g. in case the target program is being executed on a Java™ Virtual machine (JVM), the JVM by its very specification does not retain parent-child relation between threads. The link between the originating thread/parent and the worker thread/child is not available, though it is possible to group similar threads together with explicit coding. All of the above complicates the problem domain severely because at any point of time there could be 'n' test cases executing and 'm' user threads where there is no mapping from 'n' to 'm'. The situation becomes even more complicated for target programs having a UI like a web interface where the user (HTTP) requests are stateless and each request runs in a separate thread. Thus theoretically a single test case can produce N different threads and each of these threads could potentially produce many more. Without knowing which test case is associated with which threads, it is not possible to track the execution flow of a test case at an individual level which is the very premise for an optimized calibration.

Another complication arises in case of a distributed target program environment. Prior-art disclosures for test selection using dynamic analysis uses code coverage tools which are largely used in conjunction with only a single target program execution machine (TPEM). Moreover the code coverage tools work in presence of the associated source code. In many practical situations the source code may not be available. Third party libraries may have been used or there could be a lack of access to certain common code and instead executable libraries are distributed for usage without associated source code rending current solutions ineffective for such scenarios.

On one hand, the software industry is moving towards a phase where it expects regression tests to be run for every single change (commit) of the source code of the target program. On the other hand, the regression test case coverage typically increases steadily over time as more and more test cases are added to make the target program more defect-proof. This dual effect of increased frequency of test execution coupled with increase in the number of regression test cases itself slows down the entire pipeline. Significant efforts are now being spent by the industry in devising solutions to condense test suites instead of executing the entire test suite during regression. However all currently known approaches suffer from the limitations of having to run 1-test case at a time (single-thread) while the calibration is being done. Thus the calibration process itself is the bottleneck here and for reasons explained in detail in the preceding sections, it not a 1-time process either. Running one test case at a time as opposed to the industry standard practice of running test cases in parallel or multi-thread increases the execution time during calibration. Another limitation of using current approaches is that modern code is now typically service-based with data coming from multiple distributed servers. Hence existing prior-art approaches cannot be used in real-time scenarios. Accordingly, there is a need of a method, system and computer program product which can overcome the above mentioned problems.

SUMMARY

Disclosed are a method, a system and a computer program product for regression test selection in a multithreaded distributed target program execution tested by a multi-threaded regression test suite. A calibration engine according to an embodiment, isolates execution flow at individual test case level in the multi-threaded distributed target program and builds a relationship between each test case of the multi-threaded test suite and the changed code-modules simulated by the test case. The calibration engine comprises an execution-engine-tracer integrated with a throttling engine and a relationship-builder. The throttling engine at regression test execution machine (RTEM) regulates creation of threads to establish mapping between the regression test case and target program execution thread. The execution engine tracer monitors the one or more target program execution machine (TPEM) in the distributed environment to track the code modules of the target program simulated by the test case. The relationship builder establishes a parent-child relationship between the threads executing on the one or more TPEM by throttling further thread creation at the RTEM and the one or more TPEM in the distributed environment. A throttling engine at the one or more TPEM regulates creation of new threads until a relationship is established between the parent thread and the child thread. After each test case execution, a signal is sent to the one or more TPEM in the distributed environment to indicate the ending of the test case execution at the RTEM. According to an embodiment, during thread creation the threads are associated with the test cases and child threads, once the association is complete the threads are executed in parallel to reduce calibration time.

According to an embodiment, a mapping data is built by a mapper using the information captured by the execution engine tracer and the relationship builder. The mapper includes details related to each test case and the code modules it simulates on the one or more TPEM. The mapping data is fed to data store to identify a subset of impacted test cases which may be executed as a part of regression testing for any code change. The calibration engine tracks and isolates the target program execution path for all the test cases in real-time and creates a complete data store of mapping information between each test case and the code modules it simulates. The subset of impacted test cases are identified based on the changed source code and mapper data stored in data store. According to an embodiment, the target program simulation is captured by an aspect-oriented programming (AOP) point-cuts and advice.

The embodiments of the invention reduce the calibration time by using a combination of thread throttling and parent-child thread relationship building technique to enable calibration during multi-threaded and distributed target program execution tested by a multi-threaded test suite. The method includes selecting test cases for regression testing whenever the software undergoes change and eliminates the test cases that do not simulate the changed code modules. It enhances run-time behavior of the target program execution engines and builds relationships between the threads executing in the engine through throttling mechanism without affecting the actual functional execution.

One object of the invention is to provide a method and system for regression test selection in a multi-threaded, distributed target program tested by a multithreaded regression test suite and create a mapping between each test case and the code modules it simulates.

Yet another object is to monitor changed code modules to identifying the subset of the test cases to be run as a part of regression testing eliminating all test cases which do not simulate the changed code modules.

Yet another object is to reduce calibration time for multi-threaded test suites by using a combination of thread throttling and parent-child thread relationship building in a multi-threaded distributed target program execution.

Yet another object is to provide a method and system which may be adapted to any software programming language using thread throttling and thread relationship building techniques to enable calibration during multi-threaded test regression.

The method, the system, and/or the apparatus computer readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Embodiments of the invention discloses a method, a system and a computer program product for regression test selection in a multithreaded distributed target program execution tested by a multithreaded regression test suite. The method enhances run-time behavior of the target program execution engine and builds relationships between the threads executing in the target program execution machine through throttling mechanism without affecting the actual functional execution. The method reduces calibration time by using a combination of thread throttling and parent-child thread relationship building techniques to enable calibration during the multi-threaded and the distributed target program execution. Although the present embodiments have been described with reference to specific exemplary embodiments, it will be evident that various modifications and changes may be made to these embodiments without departing from the broader spirit and scope of the various embodiments.

A calibration engine according to an embodiment, builds a mapping between the test cases in a multi-threaded regression suite and a target program code-modules simulated by each test case. The target program is continuously monitored to identify the changed code-modules and the test cases mapping to the changed code modules are determined by the calibration engine which is executed as part of the regression. The calibration engine considers the ability of the test suite to multi-thread, where multiple regression test cases are executed in parallel to decrease the execution time thereby resulting in multiple users simulating the target program code modules simultaneously. The calibration engine also considers scenario where the target program itself may be multithreaded and distributed.

Figure 1:
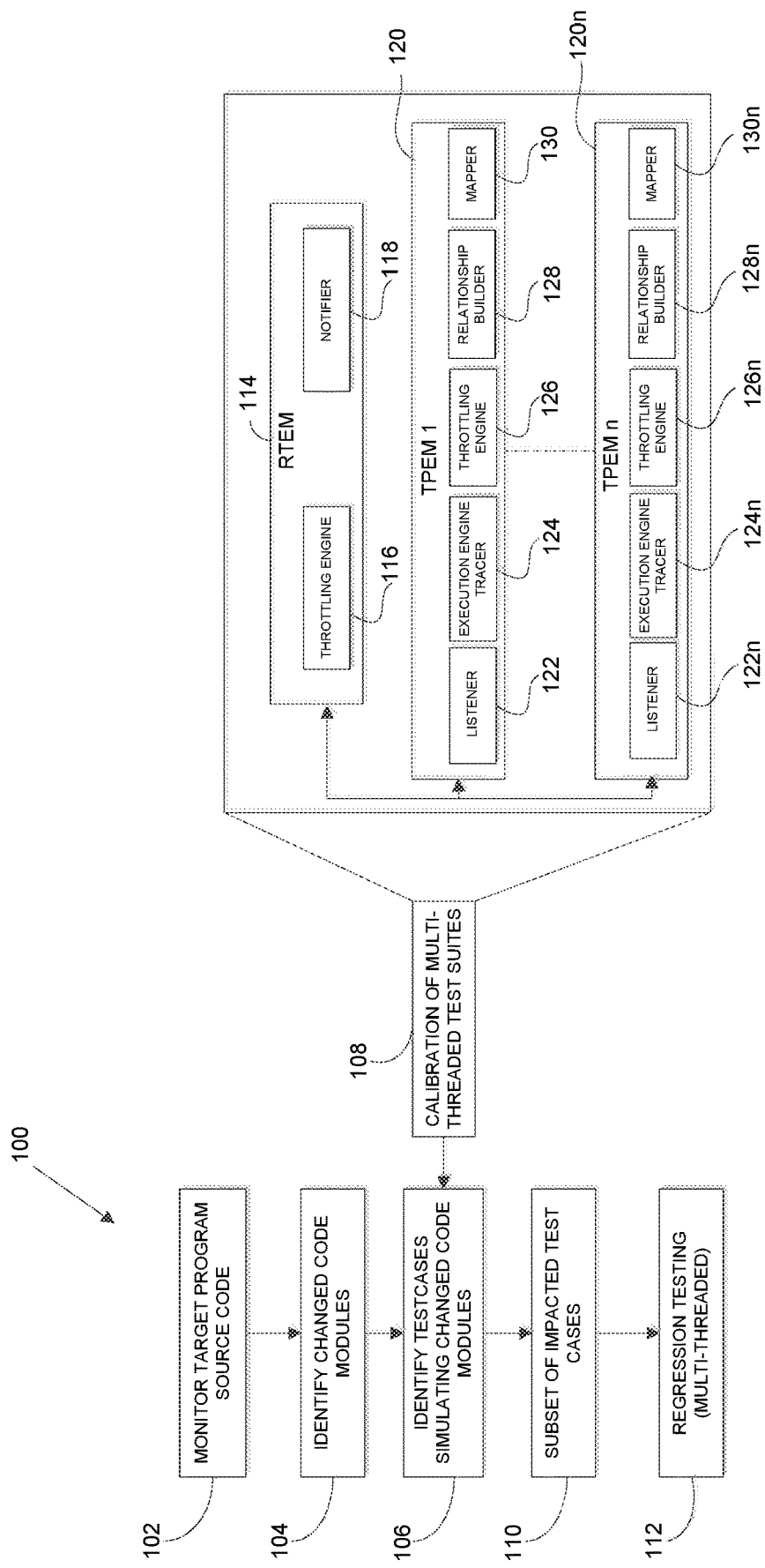
FIG. 1 is a flow diagram, illustrating an example of a method for regression test selection in a multithreaded target program execution tested by a multithreaded regression test suite, according to an embodiment of the present invention.

FIG. 1 shows a flow diagram, illustrating an example of a method 100 for dynamically tracking and isolating at a test case level, the execution flow of a multi-threaded, distributed target program tested by a multithreaded regression test suite and using the information captured to selectively run a subset of regression test cases each time the software undergoes a change. The method 100 includes monitoring target program source code in real-time (102), identifying the changed code modules (104), identifying the test cases simulating the changed code modules (106) from calibration of multi-threaded test suites (108), identifying subset of impacted test cases (110) and selecting test cases for regression testing (112).

According to an embodiment, the changes in the target program source code triggers Abstract Syntax Tree Comparator (ASC) engine 204. The ASC engine 204 identifies the changed code modules between the two versions of the target program source code. The changed code modules are fed as input to a data store 206 where the mapping data of each test case and the code modules simulated are stored. The subset of impacted test cases simulating only the changed code-modules is identified 110 and executed 112 based on the data stored in the data store. The calibration engine 201 according to an embodiment, dynamically tracks the execution flow of a multi-threaded, distributed target program tested by a multithreaded regression test suite and isolates the execution flow at the individual test case level.

The calibration engine 201 comprises a regression test execution machine (RTEM) 114 and a target program execution machine (TPEMn) 120n. The RTEM 114 includes a throttling engine 116 and a notifier 118. The target programs are executed at the one or more TPEMn 120n. The TPEMn 120n includes a listener 122n, an execution engine tracer 124n, a throttling engine 126n, a relationship builder 128n and a mapper 130n. The execution-engine-tracer 124 is integrated with a throttling engine 126 and a thread-relationship-builder 128 in each TPEM 120. The calibration engine 201 builds the mapping between the test case in the RTEM 114 and the code modules simulated at target program execution machine TPEMn 120n in a multithreaded, distributed target program execution.

Figure 5:
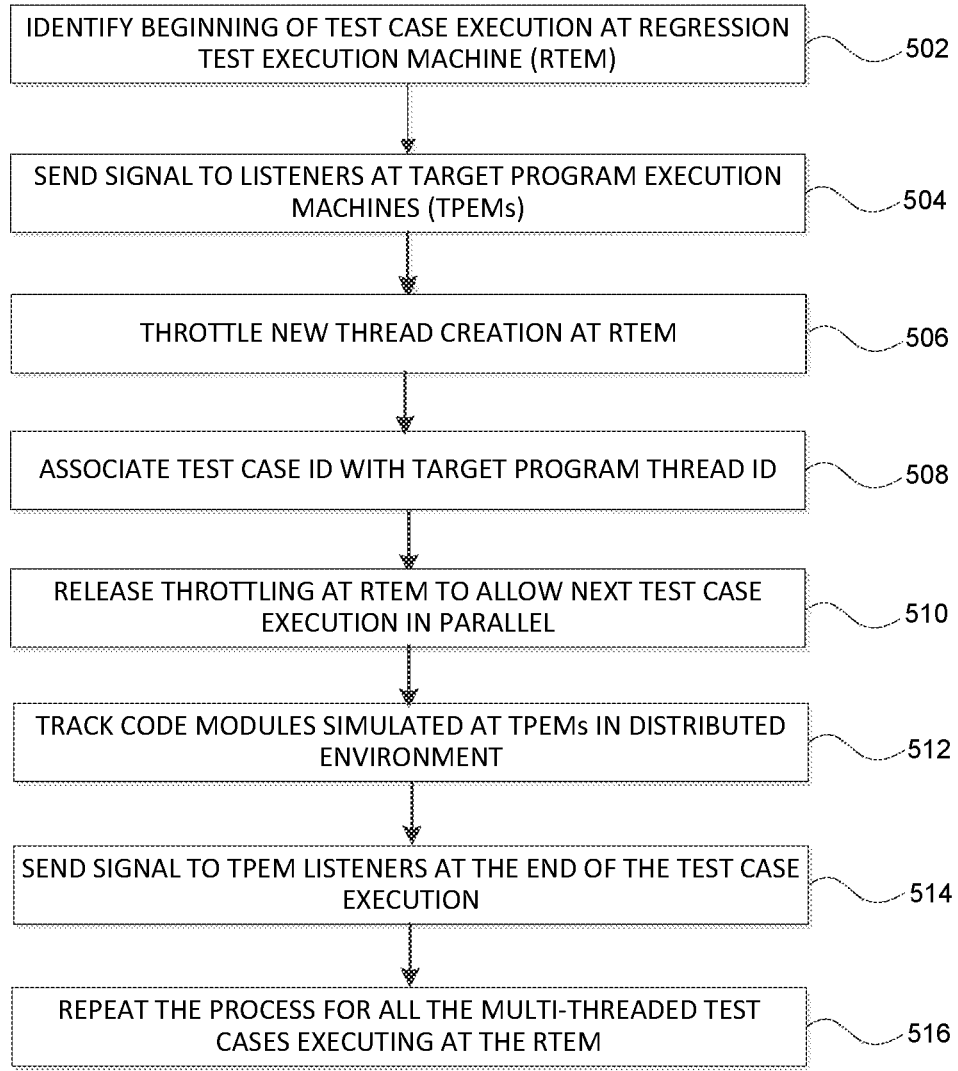
FIG. 5 shows a flowchart, illustrating an example of a method for throttling thread creation at the regression test execution machine (RTEM) in a multithreaded target program execution, according to embodiment of the present invention.

The exemplary method for throttling thread creation at the RTEM 114, is as shown in FIG. 5. This example of the method includes identifying beginning of the test case execution at the RTEM 114 (502). A signal is sent to the listeners 122n on the TPEMs 120n by the RTEM notifier 118 to indicate the beginning of each test case executed in the multi-threaded test environment (504). The throttling engine 116 at the RTEM 114 regulates creation of new thread (506). A mapper associates each test case with the target program thread ID (508). Once the association is completed, a signal is sent to the RTEM 114 to release the throttling and allow execution of the next test case in parallel (510). The execution engine tracer 124n meanwhile monitors the TPEMn 120n to capture all the code modules of the target program simulated by each test case in a distributed environment (512). Once the test case is complete, the notifier 118 at the RTEM 114 notifies the listeners 122n on the TPEMs which then extracts the relevant code simulation information from the mapper to an external data store (514). Similarly, all the test cases in the RTEM 114 which simulate the code modules in TPEMn 120n are dynamically tracked by the calibration engine 201 in a multithreaded, distributed target program execution (516).

The relationship builder 128n maintains an internal data store containing the mapping of each test case to the TPEMn 120n thread executing that particular test case and also maintains the relationship between the parent and child threads on the TPEMn 120n. The relationship builder 128n works in conjunction with the execution engine tracer 124n to identify all code modules simulated by executing test cases in the distributed environment and passes it on to the mapper 130n. The code simulation information from the mapper 130n is extracted to data store 206 to identify the subset of impacted test cases 110 which may be executed as a part of regression testing 112.

Figure 6:
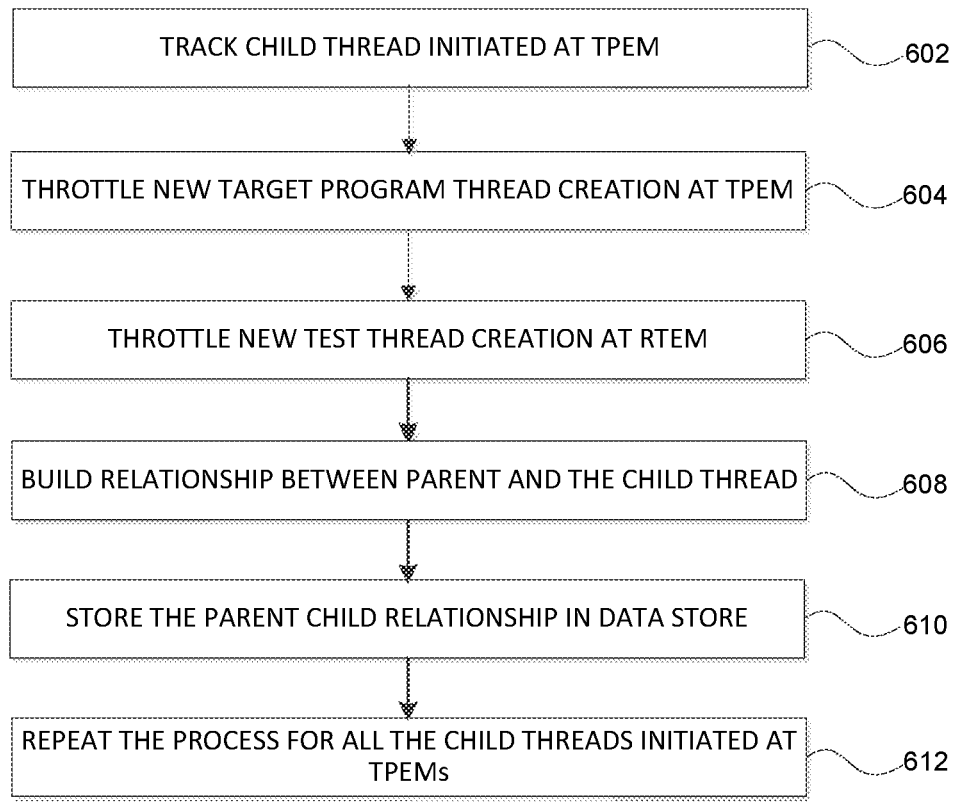
FIG. 6 shows a flowchart, illustrating an example of a method for throttling thread creation for building a parent-child relationship in a multithreaded distributed target program execution, according to embodiment of the invention.

The example of a method for building parent-child relationship in a multithreaded distributed TPEM 120*n*, is as shown in FIG. 6. The method includes tracking child thread initiate by the parent thread (602), throttling new target program thread creation at the TPEM 120, whenever child thread is initiated by the parent thread (604), throttling new test thread creation at RTEM 114 (606), building relationship between parent and child threads by the relationship builder (608), storing the parent-child relationship in the data store (610) and repeating the process for building parent-child relationship whenever new child thread is initiated at TPEMn 120*n* (612). The relationship builder 128*n* maintains the mapping between the test case executing on the RTEM 114 and the corresponding target program execution thread on the TPEMn 120*n*. The relationship builder 128*n* also establishes a parent-child relationship between the threads executing on the TPEMn 120*n* in the multi-threaded environment. The throttling engine 126*n* at the TPEMn 120*n* regulates the creation of new thread until a relationship is established between the parent thread and the child thread.

The ASC engine 204 uses the differences in the Abstract Syntax Tree (AST) representations in order to identify the code changes between two versions of the target program source code. The ASC engine 204 creates a list of all the changed code-modules of target program. The changed code modules are fed as input to the data store 206 to identify the list of the test cases which simulate these code modules. The impacted test cases 110 are the subset of the regression suite and are executed as a part of the software regression 112.

Figure 2:
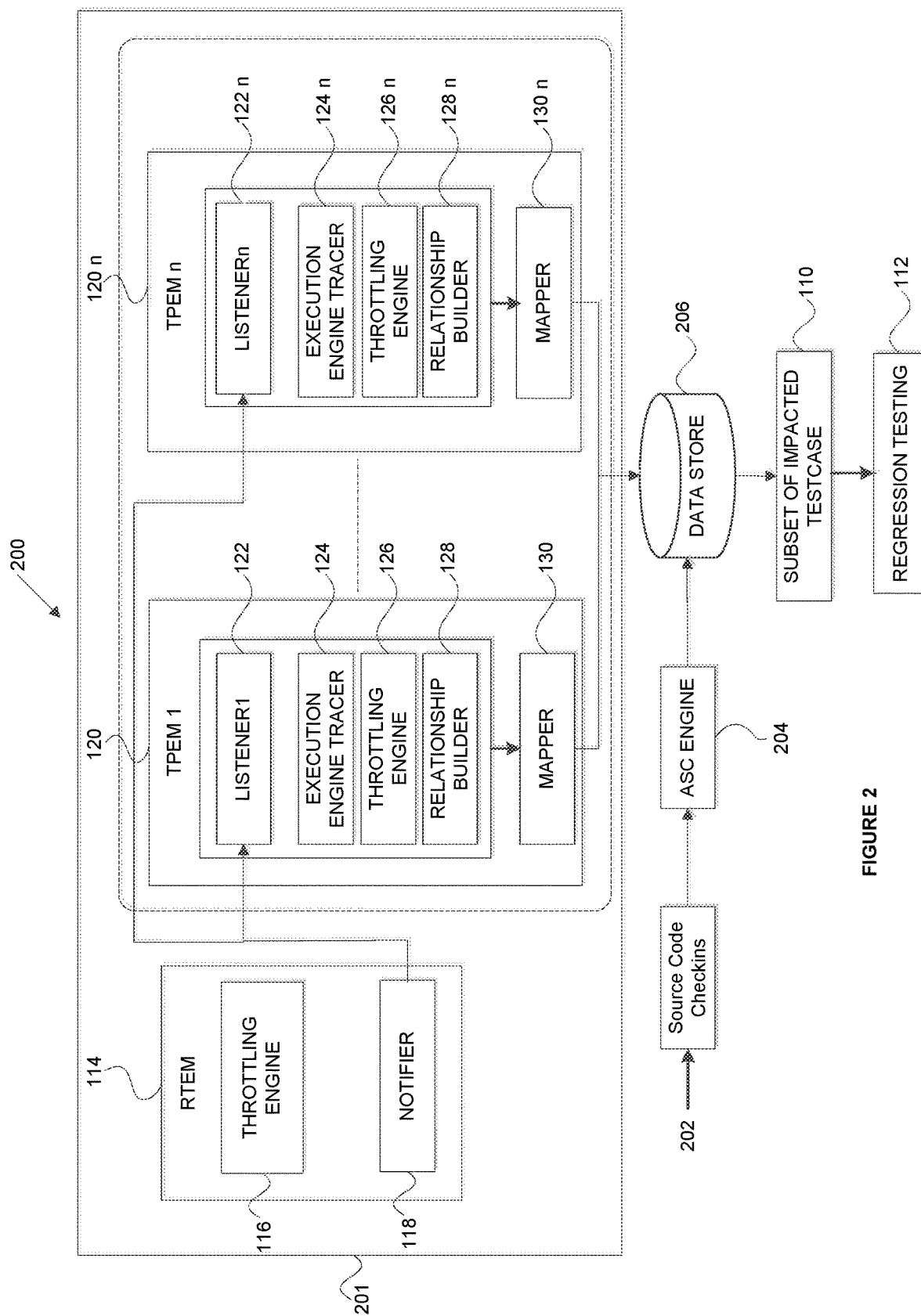
FIG. 2 shows a block diagram, illustrating an example of a calibration process for dynamically tracking and isolating at a test case level, the execution flow of a multi-threaded, distributed target program tested by a multithreaded regression test suite, according to an embodiment of the present invention.

FIG. 2 shows an example of a block diagram of a system 200, according to embodiment of the present invention. FIG. 2 illustrates a calibration process for dynamically tracking and isolating at a test case level, the execution flow of a multi-threaded, distributed target program tested by a multithreaded regression test suite, according to embodiment of the present invention. The regression test case execution occur at the RTEM 114. Each test-case is delimited by start and stop signals that are triggered from the test suite. The start and stop signals are triggered through Application Programming Interfaces (APIs) exposed by the test framework. In an embodiment, the start and stop signals is triggered by Aspect Oriented programming (AOP) point cuts and advice. The test case start signal is passed on to the listener 122*n* on the distributed TPEMn 120*n*. After receiving the start signal, the listener 122*n* on the TEPMn 120*n* triggers execution engine tracer 124*n*. The execution engine tracer 124*n* works in conjunction with the throttling engine 126*n* and the relationship builder 128*n* to build the mapping between each individual test case and the code modules in distributed TPEMn 120*n* that it simulates in a multithreaded RTEM 114 and multithreaded TPEMn 120*n*. The test case stop signal from the RTEM 114 causes the execution engine tracer 124*n* to stop tracing and moves the tracing information to a mapper 130*n*. The mapper 130*n* arranges the tracing information and saves it to the data store 206 for querying by the ASC engine 204. The abstract computing machine may be used to run a general purpose computer programming language. Consider for example, if the regression tests are executed on abstract computing machine like Java™ Virtual Machine, the start and stop signals may be triggered by AspectJ point-cuts or advice.

According to an embodiment, the execution engine tracer 124*n* captures the code modules of the target program simulated by the test case. The code modules are captured during the execution-time without modifying the target program. According to an embodiment, an AOP is used to capture the target program simulation by the execution engine tracer 124*n*, if the target program is an object-oriented program. The AOP avoids dependency on either the source code or any code coverage tool to achieve calibration. The AOP adds additional behavior to existing source code without modifying the code itself. The AOP identifies the modified code through an AOP point-cut specifications. The AOP point-cuts and advice is used to track the dynamic execution of the target program. According to an embodiment, the target program simulation is captured by AspectJ point-cuts or advice, if the target program is the object oriented program and is executed on the Java™ Virtual Machine (JVM).

According to an embodiment, the listeners 122 are setup on each TPEM 120. The listener ports listen to the start and stop signals from the RTEM 114 indicating the starting and/or ending of the regression test case. The listeners 122*n* passes the start/stop signals to the execution engine tracer 124*n* of the TPEMn 120*n* which uses this information during calibration time.

According to an embodiment, the relationship builder 128*n* builds the relationship between the multiple threads executing on the TPEMn 120*n* and the RTEM 114. The relationship builder 128*n* creates relationship between threads executing on the TPEMn 120*n* and maintains relationship maps and groups threads originating from a common source. The throttling engine 116 at the RTEM 114 throttles creation of threads to build relationship between the test cases and the respective TPEM 120*n* threads. The throttling is also done at the TPEM 120*n* to establish relationship between various threads associated with each test case by the relationship builder 128*n*. The relationship builder 128*n* creates a parent-child relationship by throttling new target program thread creation on TPEM 120*n* as well as new test thread creation on RTEM 114, until the relationship is established between the existing parent and child thread. According to an embodiment, the code modules is a logical block of code like function or a method in software program. The RTEM notifier 118 passes signals in the form of HTTP calls to the listeners 122*n*. The listeners 122*n* may be NanoHttpd ports.

The method for throttling creation of threads at RTEM 114 for establishing relationship between the test case and the target program execution thread comprises setting a throttle flag indicator on the RTEM 114 to high at the beginning of the test case, throttling creation of new thread on the RTEM 114 as long as the throttle flag indicator is set to high to prevent new regression test cases from getting executed, awaiting creation of a new execution thread on the TPEM 120 indicating beginning of simulation of target program code modules by the regression test case, associating the test case ID with the target program thread ID by the relationship builder 128 and setting the throttle flag indicator on the RTEM 114 to low thereby allowing new threads to be created in the multi-threaded test environment. The high and low signal of the throttle flag indicator is a Boolean flag that indicates '1' for High and '0' for Low status. The status of the Boolean flag is queried by AOP point cuts or advice. The advantage of using throttling mechanism in a multi-threaded environment versus the conventional approach of single-threaded models is that throttling merely halts the subsequent thread or test case creation until an association is made between a test case and the TPEM thread. After this association is made, the creation of subsequent threads or test cases are resumed even as the first test case is being executed. In a single threaded model the test cases are executed serially and each test case is executed only after the previous one has fully executed. It can be gauged that the throttling mechanism would take only a minute percentage of the execution time taken by the single threaded model.

According to an embodiment, the thread throttling is done by the AOP agent which runs as a separate software program executing on the RTEM 114 as well as the TPEMn 120*n*. In case the target programs is being executed on a Java™ virtual machine, then the thread throttling engine 116, 126*n* is done by the AspectJ agent executing on the RTEM 114 & the TPEMn 120. The thread throttling regulates creation of new threads. During creation of threads, the throttling engine associates the new thread with the test case/child threads and then once the association is built, it lets the thread execute in parallel.

Consider an example, where five user interface test cases are being calibrated with single thread model. Assuming each test case execution takes 30 seconds, total calibration time will be 5*30=150 seconds. Considering, if the same set of 5 test cases are calibrated by a multi-threaded suite, by applying thread throttling model for calibration, according to present invention.
 a. The thread throttling happens primarily during thread creation when the thread association is being built between new test case TC'N' and the corresponding thread executing at the TPEM. The time taken for building the association is in microseconds and is negligible compared to the actual test execution time in such model.
 b. Time taken for calibrating $1^{st}$ Test case (TC1)=N microseconds (for association)+30 s (for execution)=Total 30 seconds (rounded)
 c. Time taken for TC2=N microseconds (waiting in queue for first test case to get associated)+N microseconds (association time for TC2)+30 s (execution)=30 seconds (At this stage TC1, TC2 are executing in parallel)
 d. Time taken for TC3=2*N microseconds (waiting for first and then second case to get associated)+N Microseconds (TC3 association)+30 s=30 seconds (now note that TC1, TC2, TC3 are executing in parallel)
 e. Time taken for fifth test case=5*N microseconds+ 30=30 seconds+few additional microseconds which is negligible (now note that all TC1, TC2, TC3, TC4, TC5 are executing in parallel)
 f. Total time for execution of all TCs which is the time taken for calibration is 30 seconds+5*N microseconds Thus calibration time is brought down from 150 seconds to slightly above 30 seconds with thread throttling. This effect is far more visible for greater number of simultaneous threads.

The embodiments of the present invention can be used in any abstract computing machine to run a computer programming language for regression test selection in a multi-threaded target program execution tested by a multithreaded test suite. Considering for example, if the target program is executing on the Java™ virtual machine, then the method for building the parent-child relationship comprising, tracking the new thread submission by the parent thread to the ExecutorService on the TPEMn 120*n*, the ExecutorService being a standard class provided by JDK to aid in multi-threaded programming, setting the throttle flag indicator on the TPEMn 120*n* to high, holding submission of new tasks on the TPEMn 120*n* to the ExecutorService as long as the throttle flag is set to high, tracking the beginning of the execution of the submitted thread by the worker-thread/child thread, associating the threadID of the worker thread ID/child thread ID with the parent thread, storing the relations between threads in the data store and setting the throttle flag indicator on the TPEMn 120*n* low to allow submission of new tasks to the ExecutorService on the TPEMn 120*n*. The method uses AspectJ point-cuts/advice to add the aforesaid behavior at run-time to the program.

According to an embodiment, the method for building the parent-child relationship if the target program is executing on the Java™ virtual machine, comprising creating an association between threads using the Java™ Virtual Machine's internal memory representation of its objects as returned by the system identity hashcode method provided by the JDK, the method comprising using AspectJ pointcuts/advice, tracking the hashcode of the task object passed to the ExecutorService, comparing this hashcode with the system identity hashcode of each new task executed by the service executor, associating the parent & the child threads in case of a match, and building the relationship between threads.

According to an embodiment, if the target program is executing on the Java™ virtual machine in absence of target program source code, the method comprising dynamically tracking code-modules simulated by the TPEMn 120*n* by AspectJ pointcuts or advice, comparing the Java™ method signatures in the absence of source code to identify the changed code-modules and creating a list of impacted regression test cases.

Figure 3:
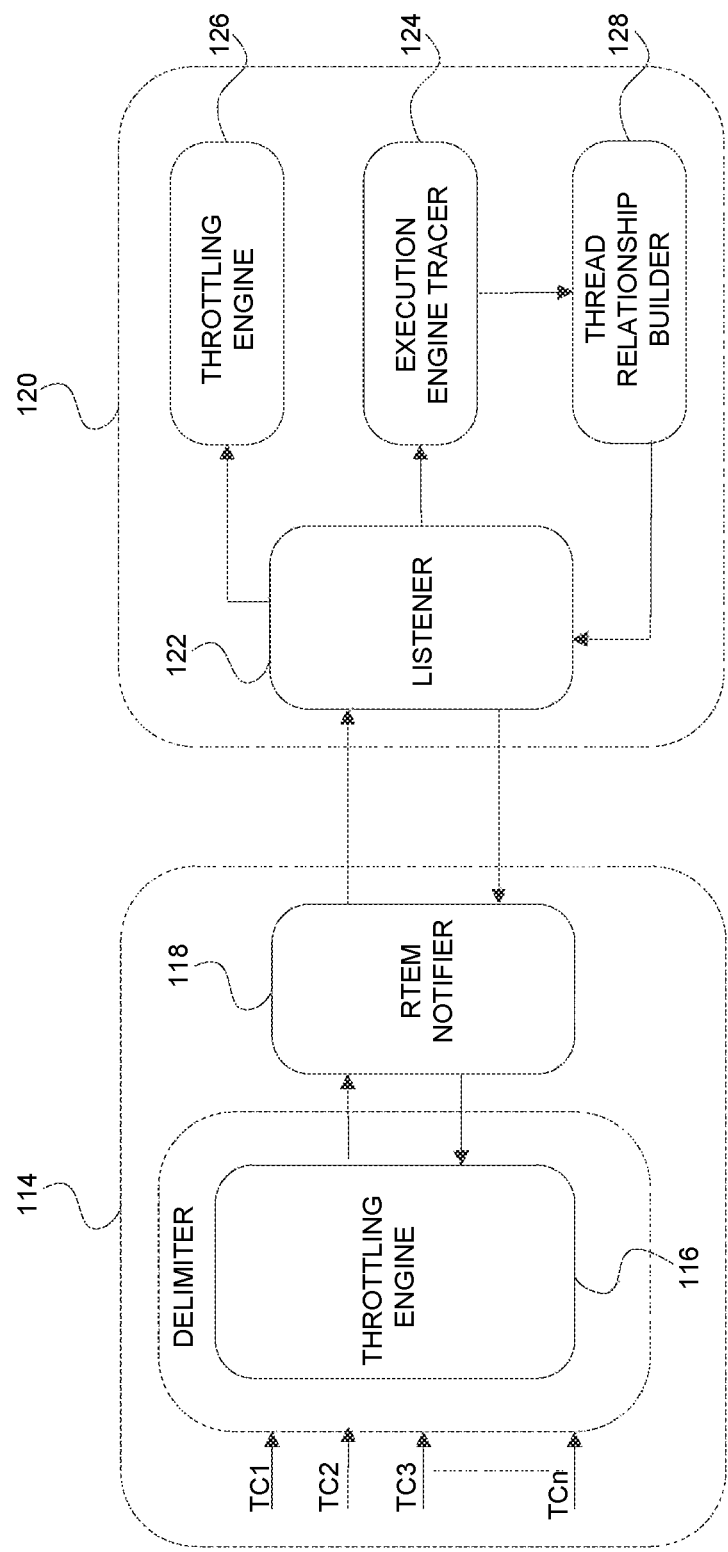
FIG. 3 shows a block diagram, illustrating an example of a working of a throttling engine and a relationship builder, according to an embodiment of the present invention.

FIG. 3 shows an example of a block diagram, illustrating a detailed working of the throttling engine 116, 126*n* and the relationship builder 128*n*, according to an embodiment of the present invention. The throttling engines 116, 126*n* controls the threads that are getting executed. Throttling in general, is the capability of regulating a rate of input for the system, where output rate is slower than the input. The throttling engine 116, 126*n* is an aspect oriented programming (AOP) agent executing on the RTEM 114 and the TPEMn 120*n*. According to an embodiment, the throttling regulates the creation of new threads or the re-use of existing worker threads/child threads. Once the threads are regulated, it becomes easy to associate child threads/worker threads with the task-originating threads and build the relationship, thereby establishing a clear trail of thread/code module execution for each test case in the multi-threaded test environment testing a multi-threaded target program.

According to an embodiment, if the RTEM 114 and the TPEMn 120*n* is executed on the Java™ Virtual machine, the throttling effect is achieved by using the AspectJ and introducing point-cuts at suitable joints which cause the existing thread execution to halt and proceed only when the signal is generated.

Multiple scenarios may be considered as below, according to present invention:
 Multi-threaded test engine testing single-threaded target programs where both RTEM 114 and TPEM 120 are on a single machine
 Multi-threaded test engine testing single-threaded target programs on a discrete RTEM 114 and discrete distributed TPEMn 120*n*.
 Multi-threaded test engine testing multi-threaded target programs where both RTEM 114 and TPEM 120 are on a single machine.
 Multi-threaded test engine testing multi-threaded target programs on discrete RTEM 114 and discrete distributed TPEMn 120*n*.

Below naming conventions are used to explain the inner workings:
 TC1, TC2 . . . TCN—The individual regression test cases executing on the RTEM 114.
 TH'N'RTEM—This is the unique thread ID on the RTEM 114 associated with a test case TCN.

TH'N'TPEM—This is the unique thread ID on the TPEMn 120*n* associated with a test case TCN (in case RTEM 114 and TPEM 120 are discrete)

ChildTH'N'TPEM—All threads produced by TH'N'TPEM (which is the Parent thread or Originating thread)

WorkerTH'N'_TH'N'TPEM—These are the worker threads for target programs executing on the Java™ virtual machines. The nature of the language specification makes it possible for general-worker threads which are not spawned by TH'N'TPEM to pick up tasks submitted to a queue by the TH'N'TPEM and execute them. The worker threads are classified as child threads thereby extending the definition of the child threads to include directly spawned threads as well as worker threads that execute tasks submitted by TH'N'TPEM.

Orphan threads—The threads which have not been mapped to any parent thread.

The regression test suites are typically executed by the test runner component of the test framework for any software language, the test-runner being any industry standard tool which orchestrates the actual test case execution. All industry standard test runners provide hooks before the start of each test case and after the completion of the test case where custom logic can be added. In a multi-threaded test execution scenario several threads gets initiated at the same time by the test-runner. Each thread executes a particular test case. Consider an example if the RTEM 114 is N-threaded, then the following threads are started TH'1'RTEM, TH'2'RTEM . . . TH'N'RTEM each of which executes the test case TC1, TC2 . . . TCN respectively. In the multi-threaded RTEM 114, the order of execution of test cases including the start API may not be guaranteed. For e.g. it is possible for TC2 to get started first and then TC1 and then TC3 and the invention is built to handle these kind of scenarios. In the case of the simpler use-case where the target program is single threaded and the regression suite is multithreaded, the working of the throttling and relationship builder components of the invention is as follows:

1. The regression suite is allowed to run in the multi-threaded mode. Test cases TC1, TC2 to TCN now run in parallel and any of the test cases may be executed on the RTEM 114 at any point of time in any particular order.
2. Inside the delimiter, the test-runner's aforesaid start/stop hooks are harnessed and at the start of the test case, the first test case that starts executing and the thread which is executing the test case is obtained. AOP constructs can be used to obtain this information for any object oriented language.
3. The throttle flag indicator at RTEM 114 is set to high and a dialog is initiated with listeners 122*n* on the TPEMn 120*n* by sending the test case start signal. In case the TPEM 120 and RTEM 114 are the same, a separate communication line is not needed.
4. In case there is no access to the regression test-suite source code, then step 2 can be executed as a part of an AOP point-cut and advice on the RTEM 114.
5. The throttle engine 116 on the RTEM 114 prevents further threads from executing as long as the throttle flag indicator is set to high. In one of the embodiments of the invention where the execution is on the Java™ virtual machine, AspectJ pointcuts and advice were used to throttle the execution of new test cases as long as the indicator is set to high.
6. Listeners 122*n* receives the test case ID TCN and the thread ID TH'N'RTEM and the execution engine tracer 124*n* now awaits simulation of the target program code modules. Once the target program code modules start getting simulated, the unique thread ID TH'N'TPEM is noted and associated with TCN and TH'N'RTEM by the Relationship builder 128*n*.
7. The execution engine tracer 124*n* dynamically traces all activities in the execution engine and captures all the code modules getting simulated along with the corresponding thread ID TH'N'TPEM which does the simulation. In one of the embodiments of the invention where the execution is happening on the Java™ Virtual Machine (JVM), AspectJ pointcuts and advice were used to track this execution.
8. After building the thread relationship as outlined in Step 6, the listeners 122*n* responds back to the TPEMn 120*n* to reset the throttle indicator to low at the RTEM 114.
9. Setting the throttle indicator to low allows the next thread to start in the RTEM 114. In the meantime, the first test case gets executed on the RTEM 114 and the corresponding code modules gets simulated on the TPEMs 120*n* which are dynamically tracked by the execution engine tracer 124*n*.
10. The steps 2-9 are carried out for each new test case. The test cases continue to execute in parallel except for a mild regulation at creation time.
11. In case of distributed service calls, the relationship needs to be carried forward to the TPEMn 120*n* which is executing the service. This is done by injecting the test case ID as a HTTP header in the service request call. This ID is read during the service execution and associated with the thread under which it is running on the TPEMn 120*n* providing the service. In one of the embodiments where the target program is running on the Java™ Virtual Machine, AspectJ pointcuts and advice is used to trap the service execution calls, inject the Test case ID obtained in step 6 during the time of request, retrieve the same during the actual service execution on another TPEMn 120*n* and build a relationship between the test case ID and the thread executing on the TPEMn 120*n* providing the service thereby allowing the tracking of all code modules simulated due to the service execution.
12. In case any of the test case ends, a signal is sent out to the listeners 122*n* which forces the execution engine tracer to move the relationship information to a mapper which extracts all the code modules simulated for that test case and moves it to a permanent data store.

Thus throttling occurs for all new threads on the RTEM 114 until an association is built between the test case TCN and the thread TH'N'TPEM. Once the association is built, the threads continue to execute in parallel. For e.g. in case max number of threads is 10 and an association is built for first 6 threads then while throttling algorithm is applicable for creation of threads 7-10, the first 6 threads are left undisturbed to execute. Thus instead of forcing a single threaded test execution which is impractical in modern-day software for reasons demonstrated earlier, the invention supports multi-threaded test executions with the minor overhead of throttling during the thread creations.

According to an embodiment, the multi-threaded test execution testing multi-threaded target program comprises the throttling engine to achieve TPEMn 120*n* throttling 126*n* in addition to throttling at RTEM 114. The throttling engine 116, 126*n* throttles the child-thread creation on the TPEM 120 until the relationship is established between the child-thread and the parent-thread to create a relationship tree of the thread hierarchy. The embodiments of the invention may vary slightly depending on the nature of the software language used by the target program.

In one example embodiment, if the target program is executing on the Java™ Virtual Machine, the invention uses AspectJ AOP point cuts to do the TPEMn 120n throttling. The parent thread creates a task in the form of callable or runnable implementations, both callable and runnable being standard JDK interfaces used for concurrency programming and submits the task to the ExecutorService. The ExecutorService assigns any of the worker threads WorkerTH'N'TPEM available at that point of time to execute the task else if no threads are available the task remains in queue. All threads executing on the Java™ Virtual Machine are siblings of one another and there is no currently known documented way to build relationship between threads effectively. The implementation of the relationship builder shown below in conjunction with thread throttling mechanism makes it possible to create this parent-child thread relationship.

Figure 4:
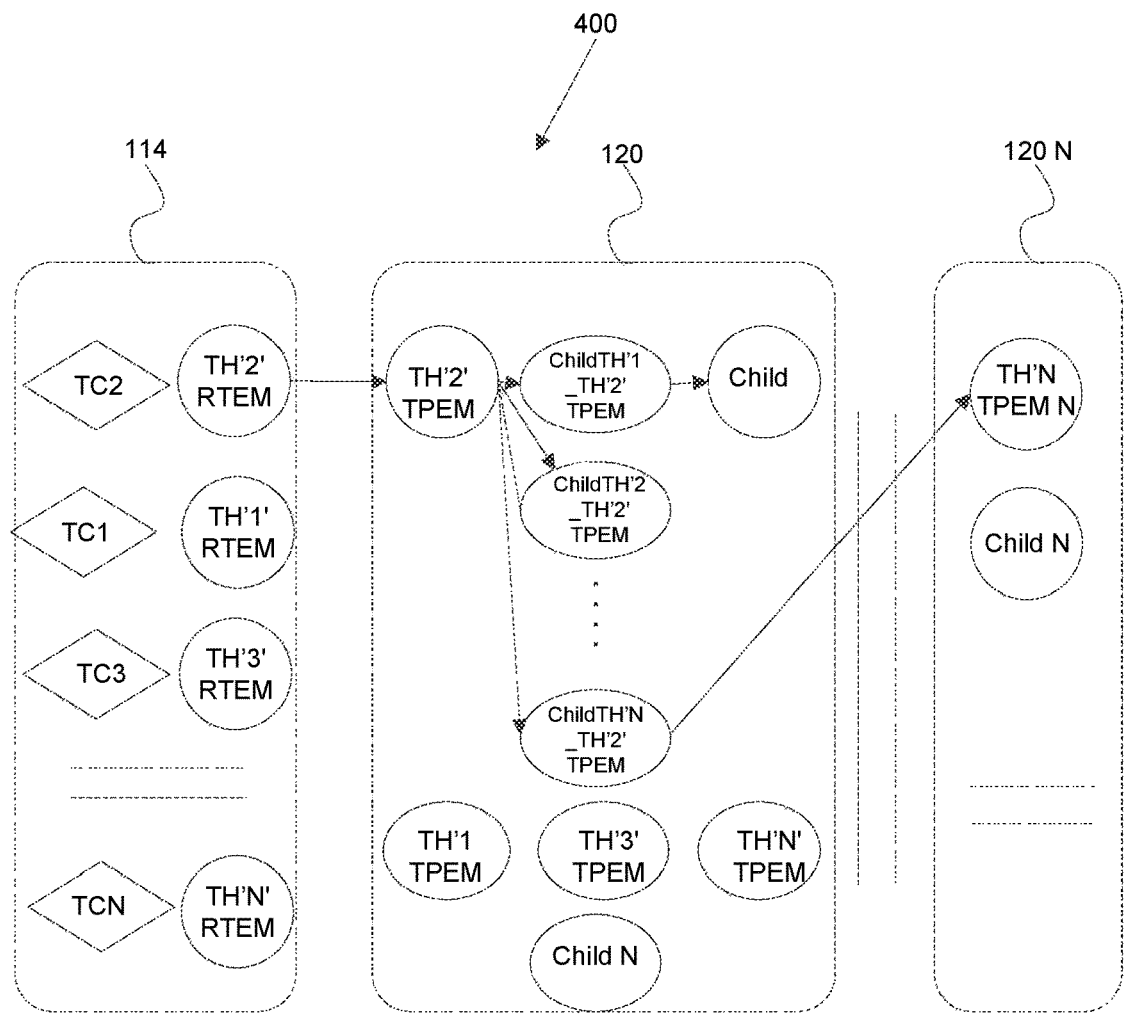
FIG. 4 shows a schematic diagram of an example of a typical thread hierarchy illustrating throttling using AOP point-cuts, according to an embodiment of the present invention.

FIG. 4 shows an example of a schematic diagram, illustrating a typical thread hierarchies 400, for throttling using AspectJ point-cuts, according to an embodiment of present invention. The throttling is done at the worker thread execution using AspectJ and a relationship is built with the parent using the following additional processes for this particular embodiment:

1. AspectJ point cuts monitors JVM for thread task submissions by the parent. Typical point cuts are Submit( ), execute( ), invoke( ) etc. on the TPEMn 120n which are the pre-defined ways of submitting the tasks as per the Java™ specification.
2. At any point of time, there are multiple threads running on the TPEMn 120n, each of which may be mapped to a test case ID (FIG. 4). Hence there may be no target program orphan/non-mapped threads executing the target program modules.
3. At this point of time, assume one of the threads (TH'2'TPEM) creates a task and submits it to the Executorservice for execution. This event is tracked by the point cut. Once the thread is created, the throttle flag indicator is set to high on both the RTEM 114 and the TPEMn 120n. On the RTEM, the point-cut prevents new test cases from executing and on the TPEMn 120n it prevents further task submissions. At this point of time the relationship between threads in the relationship builder is as follows:
   TPEM: TH'1'TPEM: TC1; TH'2'TPEM:TC2; . . . TH'N'TPEM:TCN (no un-mapped target program threads; new task submissions throttled)
   RTEM: TH'1'RTEM: TC1; TH'2'RTEM:TC2; . . . TH'N'RTEM:TCN (new test case execution throttled)
4. A worker thread/child thread WorkerTH'1'_TH'2'TPEM is created/re-used on the TPEMn 120n and starts executing the task submitted by TH'2' TPEM
5. Execution engine tracer 124 identifies the orphan or unmapped target Program threads in the AspectJ pointcut by trapping the call( ) or run( ) method which is the starting point of the worker thread and associates it with the TH'2'TPEM thread. The relationship builder now holds:
   TPEM: TH'1'TPEM:TC1; TH'2'TPEM:TC2; . . . TH'N'TPEM:TCN; WorkerTH'1'_TH'2'TPEM: TC2 (no un-mapped target program threads/task submissions can now be resumed)
   RTEM: TH'1'RTEM:TC1; TH'2'RTEM:TC2; . . . TH'N'RTEM:TCN (new test case execution can now be resumed)
6. Resume the regular execution and repeat steps 3-5 in case of further task submissions
7. Once the thread TH'N'RTEM stops executing, then un-map all worker threads associated with this test case even if the worker thread is still active and transfer the code modules simulated for the test case into the data store.
8. In case, the test case is running for long time and the worker thread/child thread has completed execution and is available for re-use by another test case, but it is still mapped to the previous test case in the relationship builder 128n. To handle such cases it is necessary to ensure that while mapping a worker thread to a test case any previous reference to that worker thread is flushed out from the in-memory data store.

According to an embodiment of the invention for target programs executing on the Java™ Virtual Machine, the thread-throttling was avoided all altogether and a hierarchy of threads and the relationship between them was built seamlessly during the multi-threaded test regression execution without resorting to TPEMn 120n throttling. The embodiment uses the memory representation of an object in the Java™ which is defined by the system identity hashcode for that object. In the Java™, the originating threads in any target program P define the tasks using callables or runnables and then submit the tasks to the ExecutorService which puts them into a blockingqueue. Worker threads are then assigned which monitor and take the task objects out of the blocking queue, and processes them. The following sequence of steps were added using AspectJ pointcuts and advice to achieve the objective of building the thread relationship:

1. Monitor JVM for thread task submissions by the parent using AspectJ pointcuts. Typical pointcuts are Submit( ), execute( ), invoke( ) etc. on the TPEM 120.
2. Add additional pointcuts to trap the call( ) or the run( ) methods associated with the callable/runnable.
3. Upon task submission, use AspectJ advice to create a new mapping containing the thread ID (parent thread) and associate it with the hashcode of the object being passed (callable or runnable).
4. The mapping data looks as follows in the relationship builder:
   TPEM: TH'1'TPEM:TC1; TH'2'TPEM:TC2; . . . TH'N' TPEM:TCN (no un-mapped threads)
   RTEM: TH'1'RTEM:TC1; TH'2'RTEM:TC2; . . . TH'N'RTEM:TCN
   New map: TH'N'TPEM:#HashcodeCallable1
5. Now in the JVM, an available worker thread reads the blockingqueue and picks up the callable1 object for execution. There are a few core the Java™ methods executed by this workerthread (e.g. beforeexecute( )) and then the call( ) method of the callable1 object is called which begins the actual task execution. This call( ) method is tracked by the point-cut.
6. At this point of time in JVM the executing thread is the child thread/worker thread, the executing method is the call( ) method and the object associated with that method is the task which is the callable object passed by the parent thread. Read the hashcode of the object and retrieve the TPEM 120 thread which is associated with this hashcode. This will be the parent thread. Thus the relationship builder includes the following mapping:

TPEM: TH'1'TPEM:TC1; TH'2'TPEM:TC2; . . . TH'N'TPEM: WorkerTH'1'TPEM:TCN
RTEM: TH'1'RTEM:TC1; TH'2'RTEM:TC2; . . . TH'N'RTEM:TCN 7. Thus a relationship may be built between the parent TH'N'TPEM and the worker thread: WorkerTH'1'TPEM. This is done without the throttling engine on the TPEM 120.

In an example embodiment, the Java™ specification does not insist on uniqueness of the hash code though it recommends the same for faster performance. Almost all modern-day implementations generate unique hash codes for objects in memory though there is a remote theoretical possibility of getting the same hash code for two distinct objects in memory. This possibility recedes to zero when we factor in the condition that both the objects have to be callable and generated by concurrently executing threads. In any case, this theoretical condition can easily be handled by checking in step 3 if any callable or runnable object stored against any existing thread or test case has the same hash code and if so, pausing the thread using an advice until the existing test case has completed execution. As the software languages constantly evolve and the invention may be further updated using the same principle methods in order to keep it relevant for some of the latest features. For example, Lambdas have been introduced into the Java™ since Java™ 8 and the invention was updated in one of the embodiments to make use of the way lambda functions are compiled and stored as byte codes in order for it to handle lambda calls as well.

The method of the present invention may be adopted with minor changes for any kind of regression test suite. For e.g. in the case of regression testing where the target program is a web application, a complexity arises out of the fact that HTTP sessions are inherently stateless and each interaction of the same user/same test case or a different user/different test case results in a new thread creation by the application container or re-use of an existing thread from a thread-pool. Thus one test case can result in N different threads being used even if the target program being tested does not explicitly use multi-threading. Each HTTP request is assigned to a different thread to be executed. This may be overcome using throttling and thread relationship building method, with some minor modifications. Here, there is a need to maintain the session IDs associated with each user-session and associate them with the corresponding test case.

In an example embodiment, a Java™ servlets were used in the target program, by using AspectJ point cuts to trap the dox method of the Java™ servlets (where X=GET, POST etc.) which executes in a new worker thread for each single HTTP request. A call to get the session ID is made in the advice to identify which test case the session ID is mapped to and accordingly create a relationship between the new thread to the existing test case. Create a new relationship between the test case and the thread or session ID in case the session ID is totally new and un-mapped. The same approach works irrespective of whether it is a simple servlet based program or a modern day web framework like spring.

The method, system and computer program product described in this invention have various advantages. The ability to function seamlessly in a multi-threaded test environment eliminating the 'one test case at a time' calibration limitation. The modern software has moved from monolithic servers to micro-services based architecture. A single test case can cause a functional flow which extends across multiple distributed servers of the target program. The invention works seamlessly in such a distributed environment.

In a specific embodiment of this invention where the target program is being executed on a Java™ Virtual Machine (JVM), relationships are built between related threads executing on the JVM which can then be used to isolate single user execution paths. Such an approach has immense potential in the general world of Java™ as currently there is no solution in Java™ to create thread relationship trees without modifying the source code to explicitly cater to such situations. For e.g. in case of MDC logging in the popular Log 4J tool—the most widely used logging tool in Java™, a user context known as MDC (Mapped Diagnostic Context) is maintained for each thread throughout the sequence of user-actions and this is used for logging and debugging purposes. MDCs are maintained in InheritedThreadLocal variables which as per the JVM specification should carry the variables to child threads from the parent threads and thus maintain the context. However this fails to work in case of Java™ ExecutorService since here, the concept of thread pools and worker-threads come into play which are already running & are re-used instead of getting created each time. Thus the MDC is not transferred and Log 4J breaks at this stage. The only workaround as suggested by Log 4J team is to create a customExecutorService or extend some of the core classes like runnable and callable to add in additional behavior to transfer the MDC. However source code access is not guaranteed all the times and also writing custom ExecutorService or runnable or callables may not always be an option. For all such cases this invention presents a seamless, non-intrusive method to link worker threads to the task originating threads and build a seamless parent-child thread tree relationship which has serious applications in the field of software debugging.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Various operations discussed above may be tangibly embodied on a medium readable through one or more processors. These input and output operations may be performed by a processor. The medium readable through the one or more processors may be, for example, a memory, a transportable medium such as a CD, a DVD, a Blu-Ray™ disc, a floppy disk, or a diskette. A computer program embodying the aspects of the exemplary embodiments may be loaded onto the one or more processors. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method for regression test selection in a target program includes multithreads execution tested by a multithreaded test suite, the method comprising:
   identifying, by a computing device, one or more test cases simulating one or more changed code modules of the target program;
   throttling, by the computing device, creation of one or more threads at a regression test execution machine (RTEM);
   mapping, by the computing device, the one or more cases in the RTEM with the one or more changed code modules of the target program at one or more target program execution machines (TPEMs) in a distributed environment;
   building, by in the computing device, a parent-child relationship between the one or more threads executing at the one or more TPEMs;
   creating, by the computing device, a mapping data comprising the one or more changed code modules of the target program simulated by the one or more test cases at the one or more TPEMs in the distributed environment;
   storing, by the computing device, the mapping data in a data store;
   monitoring, by the computing device, changes to source code of the target program; and
   identifying, by the computing device, a subset of impacted test cases for the regression test selection based on the changed source code and the mapping data in the data store;
   wherein, during thread creation, the one or more threads at the one or more TPEMs are associated with the one or more test cases executing at the RTEM and execution occurs in parallel after the association to reduce calibration time.

2. The method according to claim 1, wherein the throttling creation of the one or more threads at the RTEM further comprises:
   identifying a beginning of one or more test case executions in the RTEM;
   sending a signal to a listener at the one or more TPEMs by a RTEM notifier to indicate the beginning of one or more test case executions in the multithreaded test suite;
   setting a throttle flag indicator at the RTEM to high;
   throttling creation of new threads at the RTEM as long as the throttle flag indicator is set to high;
   awaiting creation of a new execution thread at the one or more TPEMs indicating a beginning of simulation of target program code modules by a regression test case;
   associating one or more test case IDs with the target program thread ID by a thread relationship builder; and
   setting the throttle flag indicator on the RTEM to low for new thread creation in the multithreaded test suite.

3. The method according to claim 2, wherein the RTEM notifier sends signals in the form of HTTP calls to the listener on the one or more TPEMs.

4. The method according to claim 2, wherein the listener is a NanoHttpd port.

5. The method according to claim 1, wherein the throttling is performed by an aspect oriented programming (AOP) agent executing on the RTEM and the one or more TPEMs.

6. The method according to claim 1, wherein identifying the target program simulation is done by an aspect oriented programming (AOP) point-cuts and advice.

7. The method according to claim 1, wherein the mapping data is created and updated by an aspect oriented programming (AOP) point-cuts and advice.

8. The method according to claim 1, wherein building the parent-child relationship for the one or more test cases in the multithreaded target program executing at the one or more TPEMs, the method comprising:
   tracking a child thread produced at the one or more TPEMs;
   throttling a new test thread creation at the RTEM;
   throttling further thread creation at the one or more TPEMs until a relationship is established between the child thread and a parent thread; and
   storing the relationship between the child and the parent thread by a thread relationship builder.

9. The method according to claim 8, wherein the method for building the parent child relationship for the target program executing on an abstract computing machine to run a computer programming language further comprising:
   tracking child thread submissions at the one or more TPEMs in the target program;
   setting a throttle flag indicator at the one or more TPEMs and the RTEM to high in case of the new thread submission;
   holding creation of new threads at the RTEM and submission of the new threads at the one or more TPEMs as long as the throttle flag is set to high;
   associating a child thread ID of the child thread with a parent thread ID of the parent thread;
   building a mapping data and storing relationship information in the data store;
   setting the throttle flag indicator at the RTEM and TPEM to low;
   allowing the creation of new threads at the RTEM and submission of new threads at the one or more TPEMs; and
   exposing the data store to external programs through Application Program Interface (API) on demand.

10. The method according to claim 8, wherein the target program executing on the abstract computing machine to run a computer programming language, further comprises:
    tracking one or more tasks submitted by the parent thread;
    gathering execution details of one or more child threads initiated by the abstract computing machine;
    extracting task details from the one or more child threads; and
    building a relationship between parent-child threads in case of match between the one or more tasks;
    wherein the relationship is built using an aspect oriented programming (AOP) point-cuts and advice.

11. The method of claim 1, wherein the target program executing on the abstract computing machine in absence of the target program source code, further comprises:
    tracking, the one or more changed code modules of the target program simulated at the one or more TPEMs by an aspect oriented programming (AOP) point-cuts or advice;
    comparing programming language method signatures to identify the one or more changed code modules of the target program; and
    creating a list of impacted regression test cases.

12. A system for regression test selection in a target program includes multithreads execution tested by a multithreaded test suite, the system comprising:
- a processor; and
- a memory coupled to the processor which is configured to be capable of executing programmed instructions comprising and stored in the memory to:
- monitor changes to source code of the target program;
- identify one or more test cases simulating one or more changed code modules of the target program;
- throttle creation of one or more threads at a regression test execution machine (RTEM);
- map one or more test cases in the RTEM with the one or more changed code modules simulated at the one or more target program execution machines (TPEMs);
- build a parent-child relationship between the one or more threads executing on the one or more TPEMs by throttling further thread creation at the RTEM and the one or more TPEMs;
- create a mapping data including one or more code modules simulated by the one or more test cases on the one or more TPEMs in a distributed environment; and
- store the mapping data and identifying subset of test cases for the regression test selection in the target program execution;
- wherein, during thread creation, the one or more threads at the one or more TPEMs are associated with the one or more test case executing on the RTEM and execution occurs in parallel after the association to reduce calibration time.

13. The system according to claim 12, wherein the throttling creation of the one or more threads at the RTEM further comprises:
- identifying a beginning of one or more test case executions in the RTEM;
- sending a signal to a listener at the one or more TPEMs by a RTEM notifier to indicate the beginning of one or more test case executions in the multithreaded test suite;
- setting a throttle flag indicator on the RTEM to high;
- throttling creation of new threads on the RTEM as long as the throttle flag indicator is set to high;
- awaiting creation of a new execution thread at the one or more TPEMs indicating a beginning of simulation of target program code modules by a regression test case;
- associating one or more test case IDs with the target program thread ID by a thread relationship builder; and
- setting the throttle flag indicator on the RTEM to low for new thread creation in the multithreaded test suite.

14. The system according to claim 13, wherein the RTEM notifier sends signals in the form of HTTP calls to the listener on the one or more TPEMs.

15. The system according to claim 13, wherein the listener is a NanoHttpd port.

16. The system according to claim 12, wherein the throttling creation of one or more threads at RTEM is with a throttling engine which is an aspect oriented programming (AOP) agent executing on the RTEM and the one or more TPEMs.

17. The system according to claim 12, wherein the identifying the target program simulation is done by an aspect oriented programming (AOP) point-cuts and advice.

18. The system according to claim 12, wherein the mapping data is created and updated by an aspect oriented programming (AOP) point-cuts and advice.

19. The system according to claim 12, wherein the creating the parent-child relationship for the one or more test cases in the target program executing at the one or more TPEMs, comprising:
- tracking a child thread produced at the one or more TPEMs;
- throttling new test thread creation at the RTEM;
- throttling further thread creation at the one or more TPEMs until a relationship is established between the child thread created and the parent thread; and
- storing the parent child relationship details by a thread relationship builder.

20. A computer implemented method for regression test selection in a target program includes multithreads execution tested by a multithreaded test suite, comprising:
- identifying one or more test cases simulating one or more changed code modules of the target program;
- throttling creation of one or more threads at a regression test execution machine (RTEM);
- mapping one or more test cases in the RTEM with the one or more changed code modules simulated at the one or more target program execution machines (TPEMs) in a distributed environment;
- building a parent-child relationship between the one or more threads executing on the one or more TPEMs;
- creating a mapping data including one or more code modules simulated by the one or more test cases on the one or more TPEMs in a distributed environment;
- storing the mapping data in a data store;
- monitoring changes to source code of the target program; and
- identifying subset of impacted test cases for the regression test selection based on the changed source code and the mapping data in the data store;
- wherein, during thread creation, the one or more threads on the one or more TREMs are associated with the one or more test cases executing on the RTEM and execution occurs in parallel after association to reduce calibration time.

* * * * *